United States Patent
Corbin et al.

(10) Patent No.: US 12,224,642 B2
(45) Date of Patent: Feb. 11, 2025

(54) INERTIAL ENERGY COASTDOWN FOR ELECTROMAGNETIC PUMP

(71) Applicant: TerraPower, LLC, Bellevue, WA (US)

(72) Inventors: Robert A Corbin, Duvall, WA (US); Michael J Edwards, Renton, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 86 days.

(21) Appl. No.: 17/224,115

(22) Filed: Apr. 6, 2021

(65) Prior Publication Data

US 2022/0051819 A1 Feb. 17, 2022

Related U.S. Application Data

(60) Provisional application No. 63/066,785, filed on Aug. 17, 2020.

(51) Int. Cl.
*G21C 15/18* (2006.01)
*F04B 17/03* (2006.01)
(Continued)

(52) U.S. Cl.
CPC ............ *H02K 44/06* (2013.01); *F04B 17/03* (2013.01); *F04B 19/04* (2013.01); *G21C 13/04* (2013.01);
(Continued)

(58) Field of Classification Search
CPC ......... G05B 2219/41274; H02K 44/06; H02K 7/02; H02K 7/006; H02K 7/1815; H02K 7/025
See application file for complete search history.

(56) References Cited

U.S. PATENT DOCUMENTS 3,715,270 A * 2/1973 Jackson .................. G21C 1/03
376/404
4,508,678 A * 4/1985 Costes ................. G21C 13/073
376/205
(Continued)

FOREIGN PATENT DOCUMENTS

CN 107689255 A * 2/2018
EP 514272 A1 * 11/1992 ........... F04D 13/021
(Continued)

OTHER PUBLICATIONS

JP-H0499995-A.*
(Continued)

*Primary Examiner* — Lily C Garner
(74) *Attorney, Agent, or Firm* — FisherBroyles, LLP; Jeremy P. Sanders (57) ABSTRACT

A nuclear reactor is configured with a primary coolant loop for transferring heat away from the nuclear reactor core. In a shutdown event, the primary coolant pump may stop pumping primary coolant through the reactor core, resulting in decay heat buildup within the reactor core. An inertial energy coast down system can store kinetic energy while the nuclear reactor is operating and then release the stored kinetic energy to cause the primary coolant to continue to flow through the nuclear reactor core to remove decay heat. The inertial energy coast down system may include an impeller and a flywheel having a mass. During normal reactor operation, the flowing primary coolant spins up the impeller and flywheel, and upon a shutdown event where the primary coolant pump stops pumping, the flywheel and impeller can cause the primary coolant to continue to flow during a coast down of the flywheel and impeller.

16 Claims, 4 Drawing Sheets

(51) Int. Cl.
   *F04B 19/04* (2006.01)
   *G21C 13/04* (2006.01)
   *H02K 44/06* (2006.01)
   *G21C 1/32* (2006.01)
   *G21C 3/33* (2006.01)
   *G21C 9/00* (2006.01)
   *G21C 15/12* (2006.01)

(52) U.S. Cl.
   CPC .............. *G21C 1/326* (2013.01); *G21C 3/33* (2013.01); *G21C 9/00* (2013.01); *G21C 15/12* (2013.01); *G21C 15/185* (2019.01)

(56) References Cited

U.S. PATENT DOCUMENTS

| | | | |
|---|---|---|---|
| 4,581,199 A | 4/1986 | Bioret et al. | |
| 4,773,826 A | 9/1988 | Mole | |
| 5,586,156 A | 12/1996 | Gaubatz | |
| 5,610,958 A * | 3/1997 | Shimano | G21C 15/182 376/277 |
| 6,534,946 B2 * | 3/2003 | Lelkes | H02P 1/46 310/67 R |
| 9,881,703 B2 | 1/2018 | Liszkai et al. | |
| 10,276,270 B2 * | 4/2019 | Kim | G21C 1/328 |
| 10,741,293 B2 * | 8/2020 | Abbott | G21C 15/02 |
| 11,276,503 B2 * | 3/2022 | Cisneros, Jr. | G21C 15/28 |
| 2015/0357061 A1 * | 12/2015 | Ales | G21C 21/02 376/282 |
| 2016/0273540 A1 * | 9/2016 | Mauvais | G21C 15/243 |

FOREIGN PATENT DOCUMENTS

| | | | | |
|---|---|---|---|---|
| FR | 2388376 A | * | 12/1978 | ......... F04D 15/0083 |
| JP | S5559400 A | | 5/1980 | |
| JP | S592600 A | * | 1/1984 | |
| JP | 02035397 A | | 2/1990 | |
| JP | H0373891 B2 | | 11/1991 | |
| JP | 04099995 A | | 3/1992 | |
| JP | H0571492 A | * | 3/1993 | |
| JP | 05284796 A | | 10/1993 | |
| JP | H05284796 A | * | 10/1993 | |
| JP | 0740076 B2 | | 5/1995 | |
| JP | H10332883 A | | 12/1998 | |
| JP | 3697273 B2 | * | 9/2005 | |
| JP | 2009250886 A | * | 10/2009 | |
| KR | 102201840 B1 | * | 1/2021 | |
| WO | 2015115930 A1 | | 8/2015 | |
| WO | WO-2020036361 A1 | * | 2/2020 | ............. G21C 1/086 |

OTHER PUBLICATIONS

Aizawa, Kosuke, et al. "Electromagnetic pumps for main cooling systems of commercialized sodium-cooled fast reactor." Journal of nuclear science and technology 48.3 (2011): 344-352.*
PCT/US2021/026073 International Search Report and Written Opinion dated Aug. 5, 2021; 11 pages.

* cited by examiner

INERTIAL ENERGY COASTDOWN FOR ELECTROMAGNETIC PUMP

CROSS-REFERENCE TO RELATED APPLICATIONS

This application claims the benefit of U.S. Provisional Patent Application No. 63/066,785, filed Aug. 17, 2020, entitled "CARTRIDGE CORE BARREL FOR NUCLEAR REACTOR," the contents of which is incorporated herein by reference in its entirety.

BACKGROUND

Most nuclear reactors have a core within which fuel elements and control elements are supported in different interrelated arrangements to support a critical reactivity to control the output of the reactor. Coolant is typically forced through passages between fuel elements and control elements to transfer heat generated by fissioning fuel elements to a heat exchanger to be used for useful purposes.

When a reactor is shut down, such as by inserting control elements into the reactor core to reduce the reactivity, the fission products continue to generate heat as they experience radioactive decay. In some cases, the decay heat power level is initially about 6-7% of the core output power prior to shutdown, which can result is a significant amount of heat that must be dealt with upon reactor shutdown.

A residual heat removal system is a standard safety system designed to deal with decay heat from a reactor that has been shut down, and may include emergency generators to drive circulation pumps, passive heat removal systems, and other types of heat removal systems. Without a proper functioning decay heat removal system, the residual heat can cause catastrophic failures within the reactor systems.

Some reactors utilize a direct reactor auxiliary cooling system (DRACS) or a reactor vessel auxiliary cooling system (RVACS), to deal with decay heat and these systems are primarily safety systems relied upon for removing decay heat after a reactor shutdown. In many cases, these residual heat removal systems transfer thermal energy away from the reactor core and dump it to the atmosphere.

However, these decay heat removal systems typically need electrical power in order to drive pumps to continue to circulate the primary coolant, otherwise, the coolant becomes stagnant and decay heat builds within the core, which can lead to failures. It is common to rely on a diesel generator that is designed to activate in response to a power outage to continue to operate one or more pumps to circulate the primary coolant within the reactor core to remove decay heat. It would be an improvement in the art to use a passive system that is able to continue to circulate primary coolant through the core, even in the absence of electrical power.

SUMMARY

According to some embodiments, a passive system functions to circulate primary coolant through a nuclear reactor core to allow decay heat removal through an inertial coast down system. In some embodiments, the inertial coast down system includes a flywheel associated with an impeller and is used to store kinetic energy. In the absence of electricity to drive a pump, the kinetic energy stored in the flywheel is released by the impeller, and the impeller causes the primary coolant to continue to circulate to draw decay heat away from the reactor core.

According to some embodiments, a sodium-cooled nuclear reactor includes a reactor vessel; a reactor core within the reactor vessel; a primary heat exchanger within the reactor vessel; a primary coolant loop configured to circulate primary coolant through the reactor core and the primary heat exchanger; an electromagnetic pump in fluid communication with the primary coolant loop and configured to circulate primary coolant through the primary coolant loop; and an inertial coast down system disposed along the primary coolant loop. The inertial coast down system includes an impeller; and a flywheel. The inertial coast down system is configured to store rotational kinetic energy during operation of the sodium-cooled nuclear reactor.

In some cases, the impeller is located adjacent to an inlet to the electromagnetic pump. In some cases, the flywheel is located within a cover gas region of the reactor vessel.

According to some embodiments, the impeller and flywheel are configured to release rotational kinetic energy to cause the primary coolant to flow when the electromagnetic pump stops circulating the primary coolant through the primary coolant loop.

The flywheel may be configured to have a sufficient mass to allow the impeller to continue to rotate for greater than five seconds after the electromagnetic pump stops circulating the primary coolant.

In some examples, the flywheel and the impeller are coaxial. For example, the flywheel and impeller may be coupled together by a drive shaft. In some instances, the flywheel surrounds the impeller. In some cases, the flywheel is shaftless and defines a central opening about a rotational axis of the flywheel to allow natural circulation of primary coolant to flow therethrough.

In some embodiments, a battery is configured to energize the coils of the electromagnetic pump to create an electromagnetic field to drive the impeller upon shut down of the electromagnetic pump. The impeller may be driven by the coils of the electromagnetic pump, and in some cases, when the pump is not operating, one or more coils can be energized, such as by a battery, to drive the impeller to provide coolant flow even when the pump is not fully operating.

According to some embodiments, a method of providing a coast down flow in an electromagnetic pump includes the steps of causing the electromagnetic pump to flow an electrically conductive fluid through a fluid flow path; extracting energy from the electrically conductive fluid by an impeller placed within the fluid flow path to cause the impeller to rotate; transmitting a rotational energy from the impeller to a flywheel to cause the flywheel to rotate, the flywheel having a mass to store rotational energy; and causing, upon a shutdown event of the electromagnetic pump, the flywheel to transmit the stored rotational energy to the impeller; wherein the impeller rotates and causes the electrically conductive fluid to flow along the fluid flow path.

The impeller is located near an inlet to the electromagnetic pump, near an outlet of the electromagnetic pump, or within the electromagnetic pump.

In some cases, the flywheel is located in a gaseous environment. For example, the flywheel may be located in a cover gas area of a nuclear reactor.

In some embodiments, the impeller and flywheel are coaxial. For example, the flywheel may surround the impeller, be coupled to the impeller by a drive shaft, or some other arrangement.

In some instances, the flywheel is configured to transmit the stored rotational energy to the impeller for greater than three seconds, five seconds, seven seconds, ten seconds, fifteen seconds, or more after a shutdown of the electromagnetic pump.

According to some embodiments, the flywheel is shaftless and defines a central opening to allow primary coolant to flow through the central opening along the fluid flow path by natural circulation. For example, the blades of the flywheel may be supported by an outer edge of the blades, such as by a ring, bearings, or some other suitable structure and allowed to rotate about a rotational axis passing through the central opening.

In some cases, the method further includes creating, with the electromagnetic pump, a magnetic field that causes the impeller to spin. For example, the impeller may include magnets that allow a magnetic field to spin the impeller.

According to some embodiments, creating the magnetic field is performed by a battery during a time that the electromagnetic pump is not pumping

DETAILED DESCRIPTION

This disclosure generally relates to a passive apparatus and system for decay heat removal from a nuclear reactor during a shutdown event, and includes a passive system that can operate through principals of rotational energy storage and selective release to continue circulating primary coolant in the absence of external pumping forces or external power.

There are many reasons for a reactor to shut down, such as regular maintenance, refueling, power outages, and others. In many embodiments, when a reactor shuts down, there is initially a considerable amount of decay heat that needs to be managed to avoid thermal damage to reactor components. When large atoms like Uranium or Plutonium fission, the vast majority of the energy released comes from the two smaller atoms (e.g., fission products) flying out at high speeds. Once these fission products slow down, their nuclei often remain in high-energy states, which slowly undergo radioactive decay, and produce additional heat. When the control rods enter a nuclear reactor core to interrupt the fission chain reaction, all fissions stop and the remaining fuel material stops emitting further neutrons; however, the fission products remain radioactive and will continue to produce decay heat. The decay heat power level is typically on the order of about 6-7% of the full power of the reactor immediately after a shutdown, and the reduction in power from 100% power to the 6-7% decay power approximates a near-immediate step function. The power level then continues to decay exponentially proportional to radioactive decay physics.

However, even with the rapid decrease in power, where the shutdown is accompanied by a loss of electrical power that drives the circulation pumps for the primary coolant, the primary coolant immediately stops flowing through the core and the heat exchangers and the decay heat builds quite rapidly, especially during the first few seconds after a core shutdown event.

Figure 1:
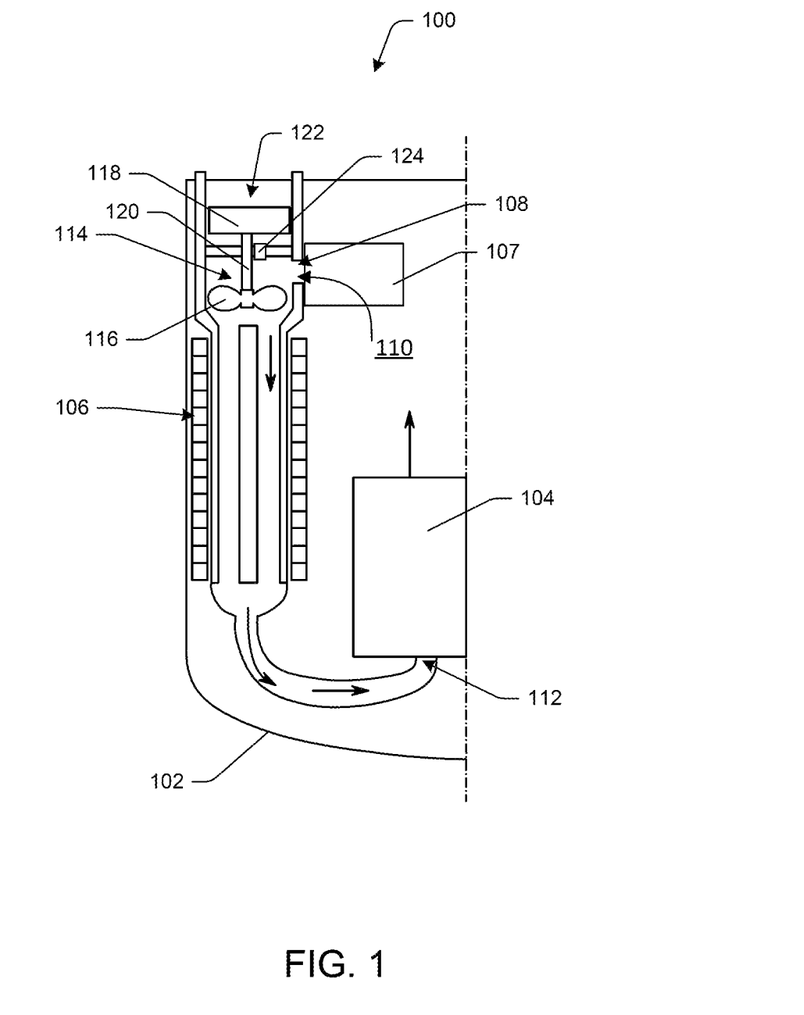
FIG. 1 is a schematic representation of a nuclear reactor vessel showing a core, a pump, and an inertial coast down system 114 located at a pump inlet, in accordance with some embodiments.

FIG. 1 illustrates a half section of a nuclear reactor 100 including a reactor vessel 102, a reactor core 104, and a pump 106 for driving the primary coolant. Other components, such as a heat exchanger 107, fuel elements, control elements, and the like may not be shown for clarity. According to some embodiments, the described systems are useful in pool type reactors in which the nuclear core 104 sits within a pool of coolant within the reactor vessel 102. In some cases, the coolant may be a liquid metal coolant, such as sodium, for example. In some cases, the coolant is circulated through the reactor vessel 102 by a pump, which may be a mechanical pump, or in some cases as illustrated, may be an electromagnetic pump 106.

An electromagnetic pump 106 is a pump that moves an electrically conducive liquid, such as liquid sodium, by forces of electromagnetism. The pump defines a flow path and a magnetic field is set at right angles to the direction of the liquid flow, and a current is passed through the fluid. The result is an electromagnetic field that causes the liquid to flow. In some cases, the electromagnetic pump 106 contains no moving parts, and it is the application of electricity that imparts magnetic forces that cause the liquid to flow along the flowpath.

As shown in FIG. 1, a primary coolant (e.g., sodium) is drawn into the pump inlet 108 from the sodium hot pool 110 above the reactor core 104, and flows through the primary sodium pump 106 downwardly to the bottom of the reactor vessel 102 and toward the core inlet plenum 112. Of course, there may be one or more heat exchangers disposed along the fluid flow path to remove heat from the primary coolant, such that the sodium returning to the core inlet plenum 112 is at a lower temperature than the coolant entering the pump inlet 108 from the hot pool 110.

While an electromagnetic pump is shown and described, it should be apparent to those of skill in the art that any pump type can be used with the disclosed systems. For example, suitable pumps include annular linear induction pumps (ALIP), conduction pumps, centrifugal pumps, as well as other types of primary coolant pumps.

In a shutdown event, there may be a loss of electricity to the pump and the flow of the primary coolant will stop, thus allowing heat to build within the nuclear reactor core 104. According to some embodiments, an inertial coast down system 114 includes an impeller 116 and a flywheel 118 coupled to the impeller, such as by a driveshaft 120. During startup of the reactor, the primary coolant pump 106 will cause the primary coolant to flow past the impeller 116, thereby imparting rotational energy to the impeller 116. The impeller 116, in turn, transmits the rotational energy to the flywheel 118 through the driveshaft 120 and the flywheel 118 spins, thus storing rotational energy.

In some cases, the flywheel 118 may be located in the cover gas area 122, and therefore may not be submerged in the primary coolant. This provides a low friction environment for the flywheel 118 to spin. In some cases, the flywheel 118 may be located in a gas-evacuated area, thus further reducing the frictional losses experienced by the flywheel 118.

In some cases, the driveshaft 120 is a rigid shaft that couples the impeller 116 to the flywheel 118. In other embodiments, the driveshaft 120 may be flexible thus providing options for locating the flywheel 118 and impeller 116 in a configuration that is not dependent on axial alignment of the flywheel 118 and impeller 116.

The flywheel 118 may be formed of any suitable material, such as a material suitable for installation within a nuclear reactor vessel and may have any suitable mass depending on the design characteristics of the inertial coast down system 114. Generally, the flywheel will have a moment of inertia abouts its axis of rotation described by Equation 1 below:

$$J_m = \int_m r^2 \, dm \qquad \text{Equation 1}$$

Where m is the integral of the flywheel's mass, and the stored rotational energy may be calculated as shown below in Equation 2:

$$w_{KIN} = \tfrac{1}{2} j_M \omega^2 \qquad \text{Equation 2}$$

Where w is the angular velocity. Hence, the stored rotational energy is dependent on the flywheel's mass and its rotational speed. Thus, the inertial coast down system 114 may be configured to have any desired rotational kinetic energy by varying the mass of the rotating system, or by varying the fluid flow velocity. The fluid flow velocity past the impeller may be increased in a localized region, such as by providing a restricted diameter through which the coolant flow past the impeller. For example, the impeller may be provided within a conduit, and the conduit may have a reduced diameter at the location of the impeller which will cause the fluid flow velocity to increase, thus increasing the rotational speed of the impeller. As the fluid velocity past the impeller is increased, the result is greater rotational energy storage. In some cases, the energy imparted to the flywheel 118 is directly proportional to the velocity at which the primary coolant flows through the pump 106. Consequently, in some cases, the impeller 116 and/or the flywheel 118 may be coupled to a sensor 124 that can be used to determine the rotational velocity of the impeller 116 and/or the flywheel 118 and this rotational velocity value can be used to determine the coolant flow velocity through the pump 106.

For example, a rotational flow meter 124 can be combined with the inertial coast down system 114 to determine the positive displacement of the fluid past the impeller 116. In some cases, the impeller 116 may be bounded by the pump 106, or a conduit associated with the primary coolant loop, in which case, the rotational flow meter 124 may also determine volumetric flow of the coolant in addition to flow velocity. For example, the pump may define a flow conduit having a circular cross-section. The impeller may have blades whose outer edge may have a tight tolerance to the inner wall of the conduit. Thus, the flow past the impeller blades may be used to determine the volumetric flow of primary coolant through the primary coolant pump 106.

In some cases, the inertial coast down system 114 is separate from the primary coolant pump 106. For example, the inertial coast down system 114 may be provided, installed, and operated completely independently from the primary coolant pump. According to some embodiment, the inertial coast down system 114 is a mechanical system, while the primary coolant pump may be an electromagnetic system with no moving parts required for operation. The electromagnetic system may impart energy to the mechanical inertial coast down system 114 in the form of rotational kinetic energy, which can be stored and used to cause primary coolant to continue to flow in the event the primary coolant pump 106 stops pumping fluid.

In use, during startup of a nuclear reactor, the primary pump 106 will begin pushing primary coolant in a circulation loop (shown by arrows) into the inlet plenum 112 at the bottom of the nuclear reactor core 104, out of the top of the core 104 into the hot pool 110, through one or more heat exchangers (not shown), and then back into the pump inlet 108. As the pump 106 pushes the primary coolant, it will pass through the impeller 116 and impart rotational energy to the impeller 116 which turns the flywheel 118. As the primary coolant reaches its steady state operational circulation speed, the impeller/flywheel also come up to a steady state speed. Once circulation is established, the control rods can be removed from the core 104 to establish a critical nuclear fission reaction, which heats the coolant within the reactor core 104.

In some events, the primary coolant pump 106 may stop circulating the primary coolant. This may occur for any of a number of reasons, such as loss of electrical power, a failure of the pump, or as a result of a beyond design basis event, for example. In any event, when the primary coolant pump 106 stops circulating primary coolant, the rotational inertia stored by the flywheel will cause the impeller to continue to spin, thereby forcing coolant to continue to flow through the primary coolant loop, which may include one or more heat exchangers. In addition, in some cases, natural circulation of the primary coolant occurs as the hot and less-dense coolant rises and the relatively colder and denser fluid falls, thus cooperating with the inertial coats down system 114 to circulate the primary coolant in the event the primary coolant pump 106 shuts down.

Figure 2:
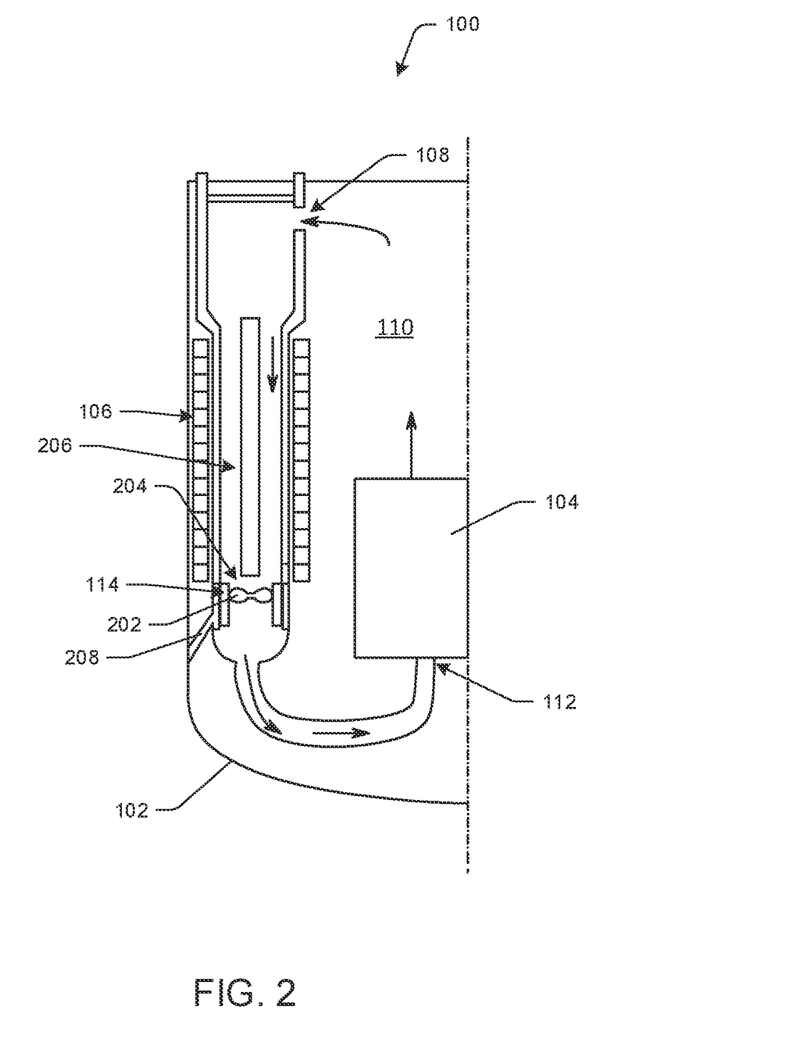
FIG. 2 illustrates a schematic representation of a nuclear reactor vessel showing a core, a pump, and an inertial coast down system 114 located at a pump outlet, in accordance with some embodiments.

FIG. 2 illustrates a half section of a nuclear reactor 100 including a reactor vessel 102, a reactor core 104, and a primary coolant pump 106 for driving the primary coolant. Other components, such as a heat exchanger, fuel elements, control elements, and the like are not shown for clarity. The inertial coast down system 114 is shown near the outlet 204 of the primary coolant pump 106. It should be appreciated that the inertial coast down system 114 may be located at any position along the primary coolant circulation loop, such as, for example, near any of a number of pump inlets 108, near the pump outlet 204, within the pump annulus 206, near the reactor core inlet plenum 112, or at any other suitable location.

While the illustrated embodiment shows the pump in a configuration to pump primary coolant downwardly with the pump inlet 108 at a higher elevation than the pump outlet 204, the pump could be reversed and have a pump inlet 108 near a bottom of the reactor vessel and a pump outlet 204 at a higher elevation than the pump inlet 108, in which case, the pump outlet 204 may be in fluid communication with piping that returns the primary coolant to the core inlet plenum 112.

In some embodiments, the inertial coast down system 114 includes an impeller 202 that is configured to rotate in response to fluid passing across its vanes. It will be appreciated that the term "impeller" is used to refer to the device that extracts energy from the flowing fluid as well as imparts energy to the fluid when the primary coolant pump 106 stops pumping the fluid. While the appropriate term for the device functioning to extract energy from the flowing fluid may be a "rotor," in the context of this description, the terms are used interchangeably and the term "impeller" does not only relate to the operating case where the inertial coast down system 114 is providing energy to the fluid, but also refers to the system as it extracts energy from the flowing fluid.

In some embodiments, the impeller 202 may include a significant mass, such that the impeller itself stores rotational kinetic energy. In some cases, the impeller and flywheel may be the same structure, or be directly coupled together without a drive shaft coupling the two components. For example, in some cases, the impeller 202 contains sufficient mass that it does not require a separate flywheel to store rotational kinetic energy.

The impeller 202 may be supported by the primary coolant pump 106, by a support 208 coupled to the reactor vessel 102, or a combination of supports that locates the impeller 202 within the primary coolant flow path.

Figure 3:
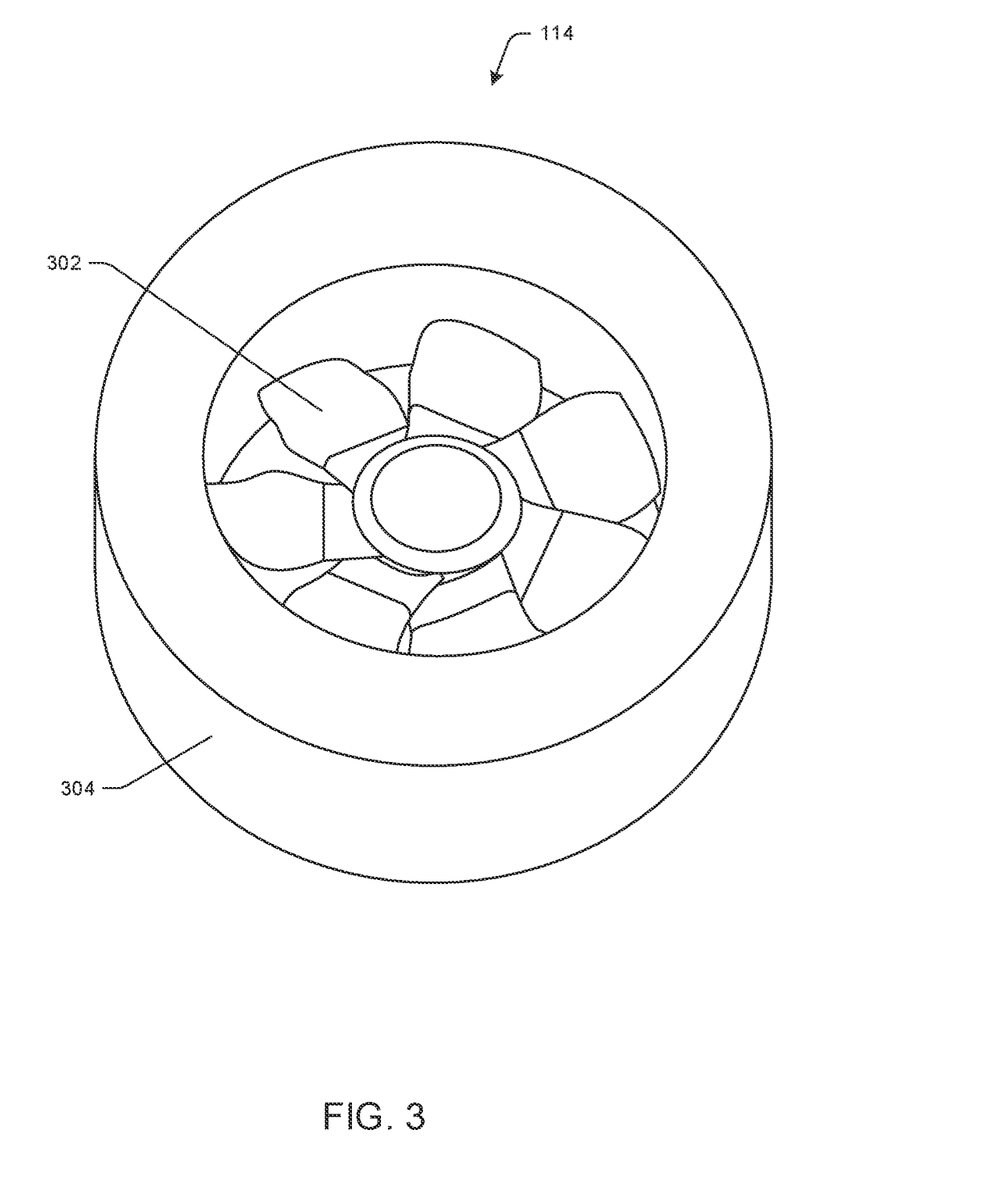
FIG. 3 illustrates a schematic representation of an inertial coast down system 114 that may be used in combination with a pump to store rotational energy and selectively impart the stored rotational energy to a primary coolant, in accordance with some embodiments.

With reference to FIG. 3, an inertial coast down system 114 is illustrated in which the impeller 302 may have an outer circumferential structure 304, such as a cage, annulus, or cylinder, about its periphery that, in some embodiments, may include at least a portion that rotates with the impeller 302. This outer circumferential structure 304 may be configured to have a mass that stores rotational kinetic energy. In some examples, the outer circumferential structure 304 may be statically mounted to a support, such as the inner wall of a fluid conduit, and positions the impeller 302 within the fluid flow. The impeller 302 may free-spin during reactor startup and operation, and if the primary coolant pump should shut down, the impeller 302 may continue to spin and will convert its rotational kinetic energy into fluid flow energy to cause the primary coolant to continue to flow through the primary coolant loop to remove decay heat from the reactor core.

Figure 4:
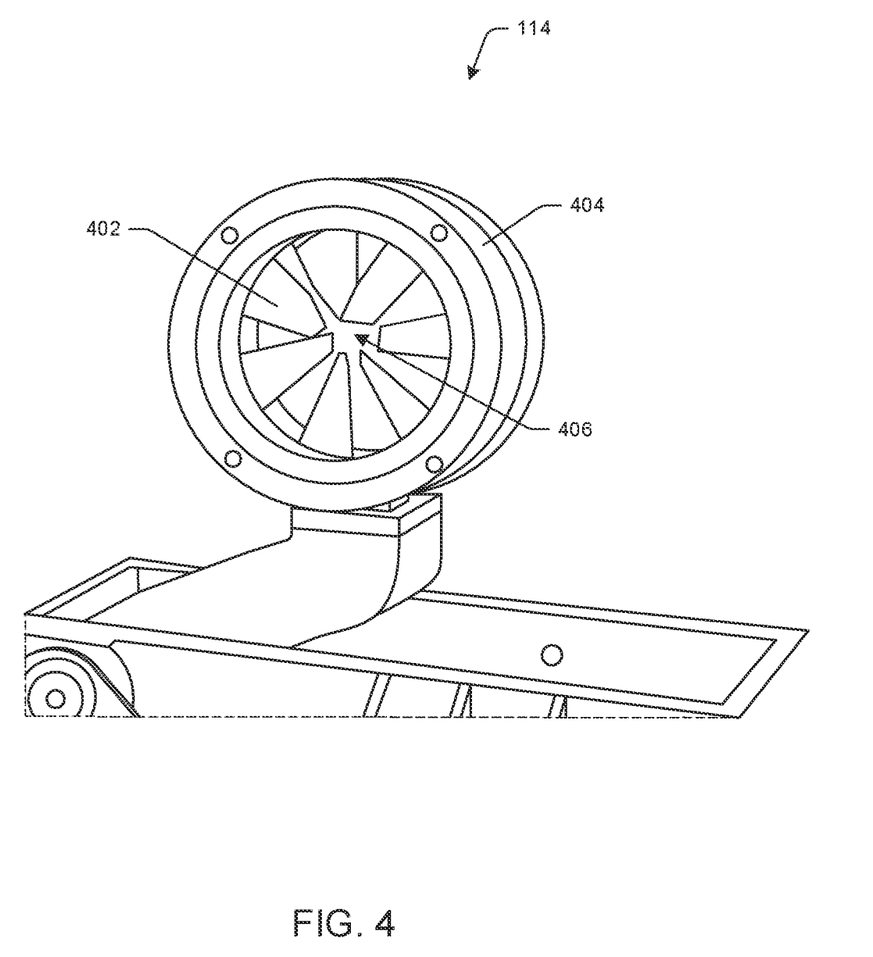
FIG. 4 illustrates a schematic representation of a shaftless impeller that can be used as an inertial coast down system 114 within a primary coolant pump, in accordance with some embodiments.

FIG. 4 illustrates an embodiment of an inertial coast down system 114 utilizing a shaftless impeller 402. In some cases, the inertial coast down system 114 can be placed inside an electromagnetic pump. An outer ring 404 can be formed to have a suitable mass to store rotational inertia. In some cases, the impeller 402 itself may have a sufficient mass in order to store rotational inertia that can be used to cause fluid to flow, such as when the primary coolant pump is not operational. For example, upon a shutdown event, the impeller 402 can continue to circulate primary coolant as the impeller 402 coasts down. The inertial coast down system 114 may be placed in any suitable location within or along the primary coolant loop, such as near the inlet or outlet of the primary coolant pump, within the pump itself, near an inlet or outlet of the reactor core, or in some other location.

The outer ring 404 may be configured to operate similarly to a stator of a motor. In other words, the outer ring 404 may provide a magnetic field to help drive the impeller 402. In some cases, the outer ring 404 may provide a magnetic field, which may be used to self-center the impeller 402 within the outer ring 404 to allow for smooth operation with relatively low frictional losses.

The impeller 402 may define a central opening 406 that allows coolant to pass therethrough. The shaftless impeller 402 with its central opening 406 may allow more natural circulation of the primary coolant even in the absence of energy from the primary coolant pump and even after the impeller 402 coasts down and stops spinning. The shaftless configuration provides the additional advantage of avoiding edge effects and reduce imparted disruption to the flow of coolant.

In some embodiments, the impeller may be driven by the electromagnetic pump. For instance, the impeller may include magnets and the electromagnetic field associated with the electromagnetic pump may positively drive the impeller. In some examples, the impeller may be optionally powered by a battery. For instance, in the cases where the electromagnetic pump stops pumping, a battery may continue to drive the impeller by providing a magnetic field that causes the impeller to turn similar to a stator of an electric motor. In some cases, a battery may turn the impeller and provide a reduced flow as compared to full power of the electromagnetic pump. In some cases, a battery can turn the impeller and provide upwards of 7% flow, 10% flow, 15% flow, 20% flow, or more to continue to circulate coolant within the reactor vessel. The battery power may be provided as a backup system in cases where the electromagnetic pump stops pumping coolant, and may allow the impeller to continue to flow coolant within the reactor to handle the decay heat within the reactor core. The battery backup feature may be provided in addition to the inertial coast down feature.

In some cases, the inertial coast down system 114 is configured to provide primary coolant flow for a suitable time after the primary coolant pump shuts down, such as greater that about 3 seconds, 5 seconds, 7 seconds, 10 seconds, 15 seconds, or more. In some cases, a halving time (e.g., the time for the flow to reduce by half) of the disclosed embodiments is on the order of 5 seconds, or 8 seconds, or 10 seconds, or 12 seconds, or 15 seconds, or more. In other words, once the electromagnetic pump is turned off, the flow will be reduced by 50% after the halving time elapses, and reduced to 25% flow after twice the halving time elapses.

In some embodiments, the impeller is positioned within the primary coolant and extracts energy as the primary coolant pump causes the primary coolant to flow. In some cases, the flywheel is separate from the impeller and may be located differently from the impeller. For instance, the flywheel may not be located within the primary coolant, but rather, may be located above the primary coolant, such as in a cover gas area, or in a sealed location that is not exposed to the primary coolant. The impeller may be supported by hydraulic bearings to allow for smooth operation. The inertial coast down system 114 may be separate from the primary coolant pump, or may have one or more components attached to, internal to, or otherwise supported by the primary coolant pump. The inertial coast down system 114 may provide for inertial coast down and continued primary coolant circulation when an electromagnetic primary coolant pump shuts down.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Throughout the instant specification, the term "substantially" in reference to a given parameter, property, or condition may mean and include to a degree that one of ordinary skill in the art would understand that the given parameter, property, or condition is met with a small degree of variance, such as within acceptable tolerances. By way of example, depending on the particular parameter, property, or condition that is substantially met, the parameter, property, or condition may be at least approximately 90% met, at least approximately 95% met, or even at least approximately 99% met.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and drawings disclose examples of systems, apparatus, devices, and techniques that may allow modules of a nuclear reactor to be fabricated in a manufacturing facility and shipped to a construction site, where the modules can be assembled, thereby greatly reducing on-site fabrication complexity and cost. Further, the systems of the nuclear reactor have been simplified and further promote factory fabrication in lieu of on-site fabrication.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A sodium-cooled nuclear reactor, comprising:
   a reactor vessel;
   a reactor core within the reactor vessel;
   a primary heat exchanger within the reactor vessel;
   a primary coolant loop configured to circulate primary coolant through the reactor core and the primary heat exchanger;
   an electromagnetic pump in fluid communication with the primary coolant loop and configured to circulate primary coolant through the primary coolant loop; and
   an inertial coast down system disposed along the primary coolant loop, the inertial coast down system comprising:
      an impeller disposed within the primary coolant along the primary coolant loop; and
      a flywheel disposed outside of the primary coolant, wherein the impeller is located upstream an inlet to the electromagnetic pump and downstream of the flywheel; and;
   wherein the inertial coast down system is configured to operate independently from the electromagnetic pump and is configured to store rotational kinetic energy in the flywheel during operation of the sodium-cooled nuclear reactor and cause the flywheel to impart kinetic energy to the impeller, the impeller disposed within the primary coolant and causing primary coolant to flow along the primary coolant loop when the electromagnetic pump shuts down.

2. The sodium-cooled nuclear reactor as in claim 1, wherein the impeller is located adjacent an inlet to the electromagnetic pump.

3. The sodium-cooled nuclear reactor as in claim 1, wherein the flywheel is located within a cover gas region of the reactor vessel.

4. The sodium-cooled nuclear reactor as in claim 1, wherein the impeller and flywheel are configured to release rotational kinetic energy to cause the primary coolant to flow when the electromagnetic pump stops circulating the primary coolant through the primary coolant loop.

5. The sodium-cooled nuclear reactor as in claim 4, wherein the flywheel is configured to have a sufficient mass to allow the impeller to continue to rotate for greater than five seconds after the electromagnetic pump stops circulating the primary coolant.

6. The sodium-cooled nuclear reactor as in claim 1, wherein the flywheel and the impeller are coaxial.

7. The sodium-cooled nuclear reactor as in claim 1, wherein the flywheel is shaftless and defines a central opening about a rotational axis to allow natural circulation of primary coolant to flow therethrough.

8. The sodium-cooled nuclear reactor as in claim 1, further comprising a battery configured to energize coils of the electromagnetic pump to create an electromagnetic field to drive the impeller upon shut down of the electromagnetic pump.

9. A method of providing a coast down flow in the sodium-cooled nuclear reactor of claim 1, comprising:
   causing the electromagnetic pump to flow an electrically conductive fluid through a fluid flow path;
   extracting energy from the electrically conductive fluid by the impeller placed within the fluid flow path to cause the impeller to rotate;
   transmitting a rotational energy from the impeller to the flywheel to cause the flywheel to rotate, the flywheel having a mass to store rotational energy; and
   causing, upon a shutdown event of the electromagnetic pump, the flywheel to transmit the stored rotational energy to the impeller;
   wherein the impeller rotates and causes the electrically conductive fluid to flow along the fluid flow path.

10. The method as in claim 9, wherein the impeller is located near an inlet to the electromagnetic pump.

11. The method as in claim 9, wherein the flywheel is located in a gaseous environment.

12. The method as in claim 9, wherein the impeller and flywheel are coaxial.

13. The method as in claim 9, wherein the flywheel is configured to transmit the stored rotational energy to the impeller for greater than three seconds.

14. The method as in claim 9, wherein the flywheel is shaftless and defines a central opening to allow primary coolant to flow through the central opening along the fluid flow path by natural circulation.

15. The method as in claim 14, further comprising creating, with the electromagnetic pump, a magnetic field that causes the impeller to spin.

16. The method as in claim 15, wherein creating the magnetic field is performed by a battery during a time that the electromagnetic pump is not pumping.

* * * * *